No. 633,990. Patented Oct. 3, 1899.
C. F. EBERHARD.
BALL BEARING.
(Application filed Mar. 13, 1895.)

(No Model.)

Witnesses
John Enders jr.
Marcus N. Byng.

Inventor
C. F. Eberhard,
by
Jos. L. Coombs
Attorney

THE NORRIS PETERS CO., PHOTO-LITHO., WASHINGTON, D. C.

UNITED STATES PATENT OFFICE.

CHRISTIAN FRED EBERHARD, OF CLEVELAND, OHIO.

BALL-BEARING.

SPECIFICATION forming part of Letters Patent No. 633,990, dated October 3, 1899.

Application filed March 13, 1895. Serial No. 541,552. (No model.)

*To all whom it may concern:*

Be it known that I, CHRISTIAN FRED EBERHARD, a citizen of the United States, residing at Cleveland, Cuyahoga county, State of Ohio, have invented certain new and useful Improvements in Ball-Bearings, of which the following is a specification.

My invention relates to ball-bearings for the wheels of carriages, wagons, bicycles, and other vehicles; and its object is to provide an improved construction of the same which shall possess superior advantages with respect to efficiency in use.

The invention consists in the novel construction and combination of parts hereinafter fully described and claimed.

Figure 1:
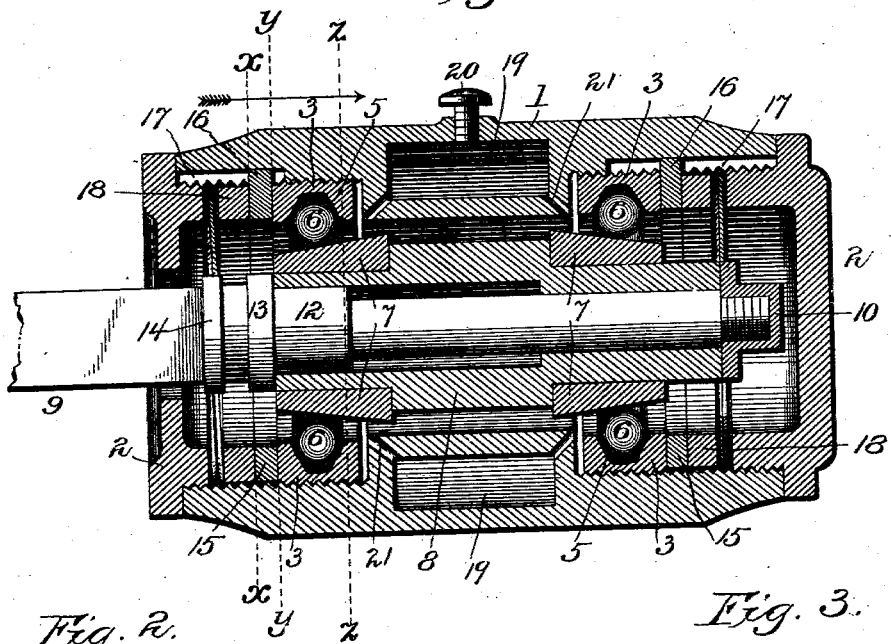
Figures 2, 3, 4:
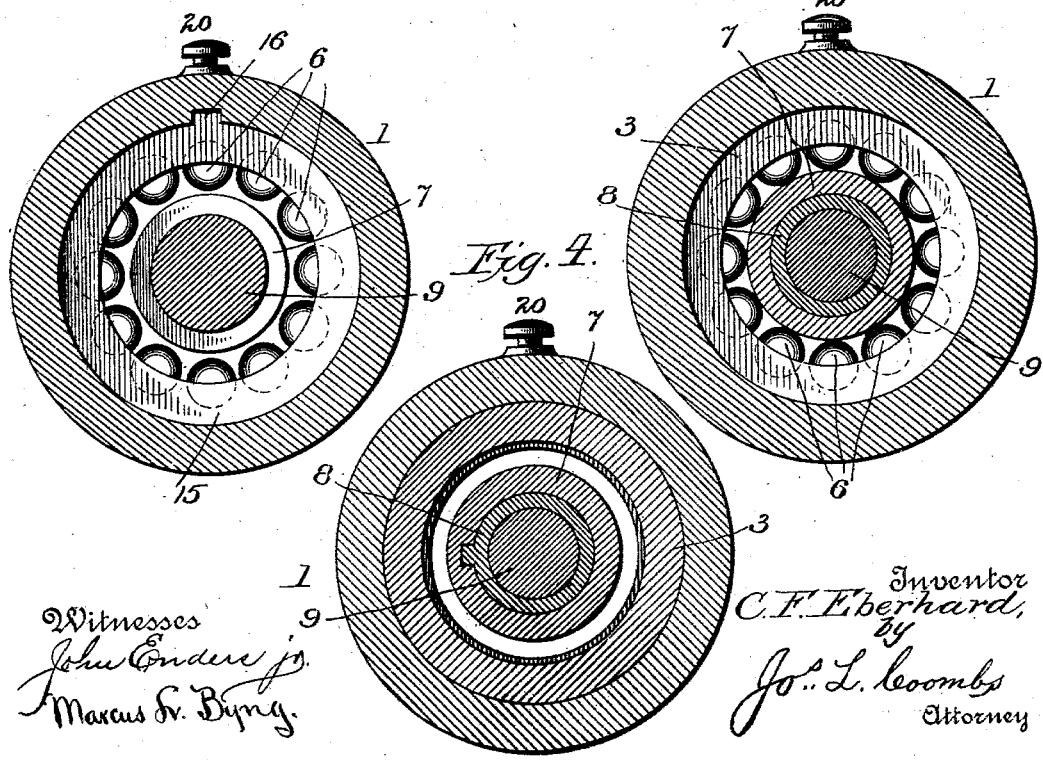

In the accompanying drawings, Figure 1 is a central longitudinal section of wheel-hub and connections constructed in accordance with my invention. Fig. 2 is a transverse section on the line $x\ x$, Fig. 1. Figs. 3 and 4 are similar views on the lines $y\ y$ and $z\ z$, respectively.

In the said drawings the reference-numeral 1 designates a vehicle-hub formed with a central bore and screw-threaded interiorly at each end, and engaging with said screw-threaded ends are screw-capss 2, through one of which the spindle hereinafter described passes. Also connected with the inner ends of the screw-threaded bore are correspondingly-threaded rings 3, the inner surfaces of which are formed with grooves or races 5, in which are seated balls 6. These balls bear against cones 7, secured to a sleeve 8, keyed to the spindle 9. This spindle at one end is provided with a screw-cap 10, while at the other end it is formed with an enlargement 12 and with collars 13 and 14. Bearing against each of said rings is a washer 15, consisting of a ring having a plain periphery and provided with a lug 16, which engages with a longitudinal groove 17 in the wheel-hub. Bearing against these washers are jam-nuts 18. By this construction the rings 3 may be adjusted with respect to the cones and be securely held in position by the washers and jam-nuts.

Formed centrally in the hub 1 is an annular oil-chamber 19, having a filling-opening closed by a plug 20 and provided with inclined passages 21.

By my invention the friction will be greatly reduced, and the construction generally is such that the invention will be found very efficient in use.

Having thus fully described my invention, what I claim is—

The combination with the hub having a screw-threaded bore and a longitudinal groove at each end, the screw-threaded caps, the screw-threaded rings formed with grooves or races, the washers having lugs engaging the grooves in said hub, and the jam-nuts, of the spindle, the sleeve, the cones and the balls seated in the races in said rings and bearing against the cones, substantially as described.

In testimony whereof I have signed my name to this specification in the presence of two subscribing witnesses.

CHRISTIAN FRED EBERHARD.

Witnesses:
   C. F. WRIGHT,
   W. A. WOLF.